(12) United States Patent
Iwai et al.

(10) Patent No.: US 10,395,877 B2
(45) Date of Patent: Aug. 27, 2019

(54) PROTECTIVE DEVICE

(71) Applicant: Littelfuse Japan G.K., Kanagawa (JP)

(72) Inventors: Masaaki Iwai, Ibaraki (JP); Takayuki Yokota, Ibaraki (JP)

(73) Assignee: Littelfuse, Inc., Chicago, IL (US)

(*) Notice: Subject to any disclaimer, the term of this patent is extended or adjusted under 35 U.S.C. 154(b) by 317 days.

(21) Appl. No.: 15/124,051

(22) PCT Filed: Mar. 4, 2015

(86) PCT No.: PCT/JP2015/056403
§ 371 (c)(1),
(2) Date: Nov. 22, 2016

(87) PCT Pub. No.: WO2015/133538
PCT Pub. Date: Sep. 11, 2015

(65) Prior Publication Data
US 2017/0076900 A1    Mar. 16, 2017

(30) Foreign Application Priority Data

Mar. 7, 2014  (JP) ................................. 2014-045646

(51) Int. Cl.
*H01H 85/02* (2006.01)
*H01H 85/36* (2006.01)
(Continued)

(52) U.S. Cl.
CPC ........ *H01H 85/0241* (2013.01); *H01H 37/34* (2013.01); *H01H 37/761* (2013.01);
(Continued)

(58) Field of Classification Search
CPC .. H01H 85/0241; H01H 37/34; H01H 37/761; H01H 85/36; H01H 2235/01; H02H 5/048; H02H 9/026
(Continued)

(56) References Cited

U.S. PATENT DOCUMENTS

| | | | |
|---|---|---|---|
| 7,505,241 B2 * | 3/2009 | McLoughlin | H01H 85/0241 361/117 |
| 2011/0304943 A1 | 12/2011 | Barton et al. | |
| 2018/0040443 A1 * | 2/2018 | Yokota | H01H 85/46 |

FOREIGN PATENT DOCUMENTS

| | | |
|---|---|---|
| EP | 1107344 A1 | 6/2001 |
| JP | H11252789 A | 9/1999 |

(Continued)

OTHER PUBLICATIONS

ISR and Written Opinion mailed in corresponding international patent application No. PCT/JP2015/056403.

*Primary Examiner* — Zeev V Kitov (57) ABSTRACT

The present invention proposes a protection device which has a large rated voltage and a large rated current, which is capable of sufficiently suppressing arc generation during activation, and which is also capable of providing suitable protection against overcurrent due to short circuiting or the like of a main circuit. The protection device of the present invention includes (i) a protection element which includes a first thermal fuse and a resistor, and in which the resistor generates heat as a result of current passing through the resistor when there are abnormalities, and the first thermal fuse is activated due to this heat and interrupts the current, (ii) a PTC element and a second thermal fuse which are electrically connected in parallel to the first thermal fuse and which are electrically connected in series to each other, and (iii) a current fuse which is electrically connected in series to the first thermal fuse.

17 Claims, 5 Drawing Sheets

(51) Int. Cl.
  *H02H 5/04* (2006.01)
  *H01H 37/34* (2006.01)
  *H02H 9/02* (2006.01)
  *H01H 37/76* (2006.01)

(52) U.S. Cl.
  CPC ............ *H01H 85/36* (2013.01); *H02H 5/048* (2013.01); *H02H 9/026* (2013.01); *H01H 2235/01* (2013.01)

(58) Field of Classification Search
  USPC ........................................................ 361/104
  See application file for complete search history.

(56) References Cited

FOREIGN PATENT DOCUMENTS

| | | |
|---|---|---|
| JP | 11273522 A | 10/1999 |
| JP | 2001216883 A | 8/2001 |
| JP | 2001313202 A | 11/2001 |
| JP | 2009032696 A | 2/2009 |
| JP | 2009295567 A | 12/2009 |
| JP | 4757931 B2 | 8/2011 |
| JP | 4943360 B2 | 5/2012 |
| JP | 2012521635 A | 9/2012 |
| JP | 2013257963 A | 12/2013 |
| WO | 2008114650 A1 | 7/2010 |
| WO | 2015002187 A1 | 1/2015 |
| WO | 2013099678 A1 | 5/2015 |

\* cited by examiner

PROTECTIVE DEVICE

TECHNICAL FIELD

The present disclosure relates to a protection device.

BACKGROUND ART

A protection device is incorporated into circuits in various electrical circuits in order to protect electric or electronic apparatuses, electric or electronic components, and electric or electronic circuits where the circuits are incorporated in cases where there is a flow of a current which is larger than a rated current and/or a voltage which is higher than the rated voltage is applied.

Among such protection devices, a protection device, a so-called fusing register, is known which includes a thermal fuse and a resistor, the resistor generates heat due to current passing through the resistor when there are abnormalities, and the thermal fuse is activated due to this heat (Patent Document 1).

Use of a bimetal switch and a positive temperature coefficient (PTC) element connected in parallel is proposed as another protection device (Patent Document 2). In such a protection device, when there are conditions when overcurrent occurs, the bimetal portion of the bimetal switch reaches a high temperature and the contact point thereof separates and opens up, and the current is commutated to the PTC element. As a result, the PTC element effectively interrupts the current which flows in the PTC element due to the PTC element being tripped into a high temperature and high resistance state due to the overcurrent.

PRIOR ART DOCUMENTS

Patent Documents

[Patent Document 1] Japanese Unexamined Patent Application Publication No. 2009-295567;
[Patent Document 2] International Publication No. 2008/114650.

SUMMARY OF THE INVENTION

Problem Solved by the Invention

It is possible to realize sufficient protection in many cases using protection devices such as the protection device described in Patent Document 1, but there are cases where there is not always sufficient protection at the rated voltage and the rated current of the protection device in electric apparatuses which use batteries or power sources with a high voltage or a high current and there is demand for higher rated voltages and rated currents.

In addition, the protection devices such as the protection device described in Patent Document 1 are typically used with the objective of protecting lithium ion storage batteries in cases where overcharging occurs in lithium ion storage batteries. The protection device described in Patent Document 1 has three terminals. These terminals are respectively connected to the power source, the storage battery, and a switch (or a control IC or the like) (these are respectively referred to a power source terminal, a storage battery terminal, and a switch terminal) in cases of being used in a charging circuit of a lithium ion storage battery. Then, a main circuit is configured by connecting the power source, the power source terminal, the thermal fuse, the storage battery terminal, and the storage battery in series in this order, and a sub circuit is configured by connecting the power source, the switch, the switch terminal, the resistor, the storage battery terminal, and the storage battery in series in this order. In a case where overcharging occurs, current passes through the sub circuit, that is, current passes through the resistor due to the switch being turned on, and the thermal fuse cuts out due to the heat which occurs at this point. In this manner, the main circuit is opened and the lithium ion storage battery is protected from overcharging. However, it is understood that this configuration cannot be said to be always suitable for protection from overcurrent which can occur in cases such as where short circuits occur in the main circuit.

It is possible to realize sufficient protection in many cases using protection devices such as the protection device described in Patent Document 2, but it has been discovered that there are cases where it is not always possible to sufficiently suppress arc which is generated during interruptions in cases of being used with, in particular, comparatively high voltages depending on the conditions. In addition, there is flow of extremely small current (leakage current) in practice even in cases where the flow of current is effectively interrupted as a result of the PTC element being in a high resistance state due to having been tripped. Even though the current is extremely small, it has been found that there are cases that it is preferable to interrupt this current. In addition, faults can occur due to the continued activation of the PTC element in cases where the period of time until the abnormality is eliminated is long when the extremely small current continues to pass through.

Therefore, the problem which the present invention attempts to resolve is to propose a protection device which has a larger rated voltage and a larger rated current, which is capable of further suppressing arc generation during activation, and which is also capable of providing more suitable protection against overcurrent due to short circuiting or the like of a main circuit.

Means of Solving the Problem

In a first application, the present invention proposes a protection device which includes (i) a protection element which includes a first thermal fuse and a resistor, and in which the resistor generates heat as a result of current passing through the resistor when there are abnormalities, and the first thermal fuse is activated due to this heat and interrupts the current, (ii) a PTC element and a second thermal fuse which are electrically connected in parallel to the first thermal fuse and which are electrically connected in series to each other, and (iii) a current fuse which is electrically connected in series to the first thermal fuse.

In a second application, the present invention proposes an electric apparatus which has the protection device described above.

Effect of the Invention

The protection device of the present invention protects circuits due to the first thermal fuse being activated as a result of current passing through the resistor of the protection element in a case where any abnormalities occur in circuits or electric apparatuses in which the protection circuit is incorporated. Since it is possible for a portion of the current which flows in the first thermal fuse to be commutated to the circuit on the PTC element side at this time, it is possible to suppress arc generation and, as a result, resistance to voltage in the protection device is improved. In addition, it is possible for the circuit to be completely opened as a result of the PTC element reaching a high temperature due to being tripped after the first thermal fuse is activated and the second thermal fuse, which is affected by the PTC element being heated, cuts out due to the heat. Furthermore, since it is possible for the current to be interrupted by the current fuse being activated even in cases where overcurrent flows through the main circuit due to short circuiting or the like, it is possible to provide suitable protection against such overcurrent.

BEST MODE OF EMBODYING THE INVENTION

The protection device of the present invention will be described in detail below with reference to the drawings. Here, note that the protection device of the present invention is not limited to the aspects which are shown.

Figure 1:
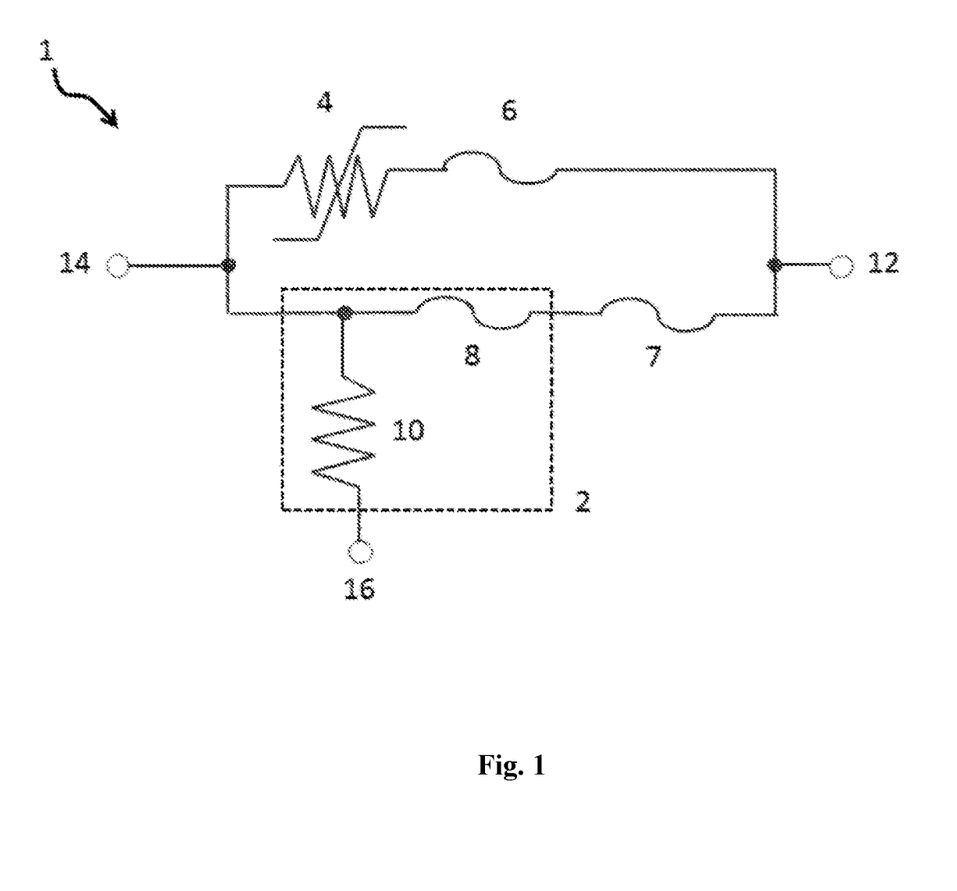
FIG. 1 is a circuit diagram of one aspect of the protection device of the present invention.

FIG. 1 shows a circuit diagram which corresponds to one aspect of the protection device of the present invention. As is shown in FIG. 1, a protection device 1 of the present invention includes a protection element 2, a PTC element 4, a second thermal fuse 6, and a current fuse 7, the PTC element 4 and the second thermal fuse 6 are electrically connected in series to each other, the protection element 2 is electrically connected in parallel to the PTC element 4 and the second thermal fuse 6, and the current fuse 7 is electrically connected in parallel to the PTC element 4 and the second thermal fuse 6 and is electrically connected in series to the protection element 2. The protection element 2 is a portion which is enclosed by the dot lines in FIG. 1 and includes a first thermal fuse 8 and a resistor 10. The protection element 2 is activated as a result of current passing through the resistor 10 and the first thermal fuse 8 cutting out due to the heat which occurs in the resistor. Furthermore, the protection device 1 has a terminal 12 for connecting to the power source, a terminal 14 for connecting to an electric apparatus which is to be protected, and a terminal 16 for passing current through the resistor 10. The terminal 12, the current fuse 7, the first thermal fuse 8 (and the PTC element 4 and the second thermal fuse 6 which are electrically connected in parallel to the first thermal fuse 8), and the terminal 14 configure one portion of a main circuit in order for current to flow from the power source to the electric apparatus, and the terminal 16, the resistor 10, and the terminal 14 configure one portion of a sub circuit in order to perform current passing through the resistor 10.

Since the resistance value of the first thermal fuse 8 is normally sufficiently smaller than the resistance value of the PTC element 4 in the protection device 1 of the present invention, current flows from the terminal 12→the current fuse 7→the first thermal fuse 8→the terminal 14 in this order (or in the reverse order) and effectively does not flow through the PTC element 4 and the second thermal fuse 6.

The protection device of the present invention has two protection mechanisms. One of the protection mechanisms is a mechanism which is due to the protection element 2 being activated, and current passes through from the terminal 16 to the resistor 10 and resistor 10 generates heat due to this in a case where, for example, overvoltage, abnormal heat generation, overcharging, or the like occurs when there are abnormalities, that is, when circumstances occur which are not preferable for electric circuits or electric apparatuses. Due to this heat, the first thermal fuse 8 is activated (that is, the protection element 2 is activated), current which flowed through the first thermal fuse 8 is commutated to the PTC element 4 due to this, and the PTC element 4 is tripped (activated) due to the current which is commutated. Next, due to the heat which occurs in the PTC element 4 which was tripped, the second thermal fuse 6 cuts out, the circuit is completely opened, and the electric circuit or the electric apparatus is protected. In the other protection mechanism, the current fuse 7 cuts out and current which flowed in the current fuse 7 is commutated to the PTC element 4 due to this in cases where overcurrent occurs due to short circuiting or the like in electric circuits or electric apparatuses, and, in the same manner as described above, the PTC element 4 is tripped, the second thermal fuse 6 cuts out, the main circuit is opened, and the electric circuit or the electric apparatus is protected from overcurrent. Here, overcurrent normally can be interrupted by the current fuse 7, but interruption is also possible using the protection element 2 by designing the protection element 2 so that current passes through the resistor 10 of the protection element 2 in response to overcurrent. Due to this design, more reliable protection is possible.

In the protection element which is used in the protection device of the present invention, the resistor and the first thermal fuse are disposed so as to be thermally coupled. That is, the first thermal fuse is affected by the resistor being heated and is activated as a result of cutting out due to heat which occurs in the resistor. The number of the first thermal fuses which are disposed is not particularly limited and there may be one or a plurality, for example, two or three. The locations where the first thermal fuses are disposed are not particularly limited as long as the first thermal fuses are electrically connected in series to the electric circuit or the electric apparatus which is to be protected, are electrically connected in parallel to the PTC element and the second thermal fuse, and are arranged to be affected by the resistor being heated, and the first thermal fuses may be disposed either upstream and/or downstream of the locations where the resistor is connected.

The resistor which is used in the protection element described above is not particularly limited if the resistor is a resistor which is able to be used as a heat generating body.

As the first thermal fuse which is used in the protection element described above, it is possible to use a thermal fuse which uses materials which are typically used in thermal fuses and it is possible to use, for example, metals with low melting points (including alloy metals with low melting points) such as solder in addition to thermal fuses which are commercially available as the first thermal fuse. As preferable metals with low melting points, there are the examples of, for example, Sn-3.0Ag-0.5Cu, and Sn-58Bi although the preferable metals with low melting points are not particularly limited. It is possible for a person skilled in the art to select a suitable thermal fuse as the first thermal fuse based on the content of the present specification so that it is possible for the target functions to be exhibited.

The first thermal fuse described above may be activated due to the typical way in which a fuse cuts out, that is, due to the fuse element melting and breaking up due to the electrode on both sides of the element being drawn together due to surface tension or may be activated due to a mechanical backup mechanism, for example, due to the electrodes which are connected to the fuse element physically separating from each other by a spring, magnets, or the like being used so that an insulation distance is secured.

As a preferable aspect, the protection element described above has a mechanism where activation of the first thermal fuse is backed up mechanically. In this aspect, one of the electrodes of the first thermal fuse is a movable electrode and the other one of the electrodes of the first thermal fuse is a fixed electrode or both of the electrodes of the first thermal fuse are movable electrodes. It is possible to further suppress arc generation since it is possible to instantly secure an insulation distance by using this mechanical backup mechanism.

As an example of the protection element described above, there is the example of a fusing register. A fusing register is a thermal fuse with low resistance which has a resistor and a metal with a low melting point (which functions as a thermal fuse) which is melted due to heat which occurs due to current passing through the resistor.

Preferably, a fusing register is used which is characterized by having a pair of fixed lead electrodes, a guide shaft being aligned with the fixed lead electrodes, a moveable electrode being arranged to span between the fixed lead electrodes in a state where the guide shaft is inserted through the movable electrode, between the tip ends of each of the fixed lead electrodes and the movable electrode and between the guide shaft and the moveable electrode being bonded using metal with a low melting point, a compression spring which acts with a force in a direction so as to separate from the fixed lead electrodes being provided in the movable electrode, and the moveable electrode separating from the fixed lead electrodes by being pressed by the compression spring due to melting of the metal with the low melting point.

More preferably, a fusing register is used which is characterized by, in the fusing register described above, one lead conductor of a resistor unit, where lead conductors are attached to both ends of the resistor, being used as the guide shaft, a coin spring being used as the compression spring, the one lead conductor being inserted through the coin spring between resistor and the moveable electrode, and a heat generating circuit where current passes through the resistor unit being connected between the one lead conductor of the resistor unit and either of the fixed lead electrodes.

The fusing register described above is described in, for example, Japanese Patent No. 4630403, Japanese Patent No. 4757931, Japanese Patent No. 4630404, Japanese Patent No. 4757895, Japanese Patent No. 4757898, Japanese Patent No. 4943359, and Japanese Patent No. 4943360. These documents are all incorporated in the present specification due to being referenced.

Here, there is only one of the first thermal fuses in FIG. 1, but the number of the first thermal fuses is not limited to this and a plurality, for example, two or more, of the first thermal fuses may be used. In addition, it is not necessary for the protection element to be a single electronic component such as the fusing register described above, and it is sufficient if the resistor and the first thermal fuse are arranged so that the resistor generates heat as a result of current passing through the resistor when there are abnormalities and the first thermal fuse is disconnected due to this heat.

The PTC element which is used in the protection device of the present invention is not particularly limited and it is possible to use a PTC element which is used in the background art, for example, a polymer PTC element or a ceramic PTC element. The PTC element which is preferable is a polymer PTC element. The number of the PTC elements which are disposed is not particularly limited and there may be one or a plurality, for example, two or three. The locations where the PTC elements are disposed are not particularly limited as long as the PTC elements are electrically connected in series to the electric circuit or the electric apparatus which is to be protected and the second thermal fuse and are electrically connected in parallel to the first thermal fuse.

The polymer PTC element described above has a PTC part with a layered formation, which is obtained as a result of pressing out a conductive composition which includes a polymer (for example, polyethylene, polyvinylidene fluoride, or the like) which is dispersed in a conductive filler (for example, carbon black, a nickel alloy, or the like), and electrodes (for example, metal foil) which are arranged on both side of the PTC part. Here, other parts such as a direct lead may be connected to the PTC part and the electrodes may be omitted in this case.

In a preferable aspect, the PTC element has a resistance value which is equal to or less than the rated voltage/abnormal current of the protection element at the usage temperature. That is, in this aspect, current which flows in the first thermal fuse is commutated to the PTC element so that a voltage which is higher than the rated voltage is not applied to the protection element when the first thermal fuse is activated.

Here, "rated current" and "rated voltage" in the present specification respectively have the meaning of the highest current and the highest voltage which are set for each of the electric parts such as the thermal fuse, the current fuse, the PTC element, the protection element, the protection device, and the like and which are such that each element can exhibit specific functions and is able to be used safely in cases where a current and a voltage is periodically applied to the electric parts.

The voltage which is applied to the protection element (in detail, the first thermal fuse) is a voltage which is applied to the protection device (the voltage between the terminal 12 and the terminal 14 in FIG. 1). Accordingly, it is sufficient if the voltage at both ends of the protection device is not higher than the rated voltage for the protection element when the first thermal fuse 5 is activated. That is, $$E_d \leq E_r \quad (1)$$

It is sufficient if, [in the equation, $E_d$=the voltage at both ends of the protection device when the first thermal fuse is activated (when there are abnormalities) and $E_r$=the rated voltage of the protection element] are satisfied.

The voltage at both end of the protection device is $$E_d = I_c \times R_d \quad (2)$$

where, [in the equation, $E_d$=the voltage at both ends of the protection device, $I_c$ is the circuit current, and $R_d$=the resistance of the entire protection device].

Here, $R_d$ is the combined resistance of the protection element (the first thermal fuse), the PTC element, and the second thermal fuse, so that $$R_d = 1/(1/R_1 + 1/(R_p + R_2))$$

where, [in the equation, $R_1$=the resistance of the protection element (the first thermal fuse), $R_p$=the resistance of the PTC element, and $R_2$=the resistance of the second thermal fuse].

Since $R_p$ is sufficiently larger than $R_2$, it is possible to ignore $R_2$, and $$R_d=1/(1/R_1+1/R_p) \quad (3)$$

Furthermore, it is possible to ignore $1/R_1$ since it is possible for the resistance value of the first thermal fuse to be seen as approaching infinity when the first thermal fuse is activated due to an abnormality occurring. That is, the resistance (Rd') of the entire protection device when the first thermal fuse is activated is $$R_d=1/(1/R_p)=R_p \quad (3')$$

When the circuit current when there are abnormalities (which is referred to as the abnormal current in the present specification), for example, a short circuit current in cases where the abnormality is a short circuit, is $I_c$, the equations (1), (2), and (3') are $$I_c \times R_p \le E_r$$

and this can be modified to $$R_p \le E_r/I_c$$

where, [in the equation, $R_p$ is the resistance of the PTC element, $E_r$ is the rated voltage of the protection element, and $I_c$ is the abnormal current].

In this manner, it is possible for the voltage which is applied to the protection element during activation is equal to or less than the rated voltage due to the resistance value of the PTC element to be equal to or less than the rated voltage/abnormal current. That is, the current which is permissible when there are abnormalities is larger due to the resistance value of the PTC element being reduced as much as possible.

Here, the usage temperature described above is the temperature of the environment where the protection device of the present invention is used in a normal state and is determined according to the applications, the placement location, and the like of the protection device. The usage temperature is typically room temperature (approximately 20° C. to 25° C.) but is not limited to this and may be, for example, a higher temperature, in detail, in a range of 25° C. to 100° C., for example, approximately 30° C. to 60° C. In addition, the abnormal current described above has the meaning of the current value which flows through the protection device when an abnormality occurs, for example, during a short circuit.

In another preferable aspect, the polymer PTC element has a resistance value which is equal to or less than the rated voltage/abnormal current of the protection element at a temperature which is 10° C. lower, preferably a temperature which is 5° C. lower, than the softening point of the polymer materials of the polymer PTC element.

It is possible to obtain the softening point of the polymer materials of the polymer PTC element described above by, for example, measuring in accordance to JIS K 7206. When the temperature of the polymer PTC element reaches a temperature which is higher than the softening point, the rate at which the resistance value of the PTC element increases becomes sharply higher and the slope of a tangent of the resistance value—temperature curve is equal to or more than five times the slope at 25° C.

The softening point of the polymer materials of the polymer PTC element is typically set to be several tens of degrees higher than the usage temperature. Accordingly, it is possible to suppress arc generation when the first thermal fuse is activated even in cases where the temperature of the surroundings of the PTC element is equal to or higher than the assumed usage temperature for any reason due to the polymer PTC element having a resistance value which is equal to or less than the rated voltage/abnormal current of the protection element at temperatures which are slightly lower than the softening point, for example, at a temperatures which is 10° C. lower, preferably, a temperature which is 5° C. lower.

In one more preferable aspect, the PTC element has a longer activation period than the insulation period for the first thermal fuse.

In the present specification, the activation period for the PTC element described above has the meaning of the period of time from when current, which is commutated due to the protection element being activated, passes through the PTC element to when the voltage between both ends (electrodes) of the PTC element reaches the rated voltage of the protection element.

In the present specification, the insulation period for the first thermal fuse described above has the meaning of the period of time from when the first thermal fuse is activated to when insulation is secured. For example, in a case where activation of the first thermal fuse is a result of the typical way in which a fuse cuts out, the insulation period for the first thermal fuse described above has the meaning of the period of time from when cutting out of the fuse element starts, that is, the point in time when the fuse element melt and become thin so that the resistance value thereof starts to increase, to when the fuse element solidifies after cutting out. In addition, in a case where the first thermal fuse is activated due to a mechanical backup mechanism, the insulation period for the first thermal fuse described above has the meaning of the period of time from when the fuse element (metal with a low melting point), which is connected between the electrodes of the first thermal fuse, melts and the electrodes start to separate from each other to when there is a state where it is possible for an insulation distance to be reliably maintained.

The activation period for the PTC element described above is preferably equal to or more than 30 milliseconds and is more preferably equal to or more than 40 milliseconds in a case where activation of the first thermal fuse is a result of the typical way in which a fuse cuts out.

In addition, the activation period for the PTC element described above is preferably equal to or more than 3 milliseconds and is more preferably equal to or more than 5 milliseconds in a case where activation of the first thermal fuse is backed up mechanically.

Here, there is only one of the PTC elements in FIG. 1, but the number of the PTC elements is not limited to this and a plurality, for example, two or more, of the PTC elements may be used.

The first thermal fuse safely interrupts current due to the fuse element melting due to Joule heat which occurs in the resistor and the melted fuse element cutting out or the fuse element being separated due to a mechanical backup mechanism and the distance between the fuse elements which have been separated (between the electrodes) being equal to or more than the insulation distance. In a state where the distance between the elements which have melted or which are separated (between the electrodes) is less than the insulation distance, arc generation can occur but arcs are extinguished when the distance between the elements is equal to or more than the insulation distance. However, since the elements immediately after cutting out do not completely solidify and have fluidity in a case where the first thermal fuse is activated as a result of the typical way in which a fuse cuts out, there are cases where the elements change shape and the distance between the elements which have separated is less than the insulation distance. In addition, in a case where the first thermal fuse cuts out due to a mechanical backup mechanism, for example, a spring, there are cases where the distance between the electrodes is not set and is less than the insulation distance due to the moveable electrode vibrating over a certain period of time after separation. At this time, when the voltage which is applied to the protection element exceeds the rated voltage of the protection element, there is aggressive arc generation and large faults can occur such as damage being imparted into the unit which is to be protected. Due to the activation period for the PTC element being longer than the insulation period for the elements in the first thermal fuse as described above, it is possible to avoid the problems as described above and it is possible for current to be safely interrupted.

The second thermal fuse which is used in the PTC device of the present invention is not particularly limited and it is possible to use a typical thermal fuse in addition to thermal fuses which are commercially available as the second thermal fuse. The number of the second thermal fuses which are disposed is not particularly limited and there may be one or a plurality, for example, two or three. The locations where the second thermal fuses are disposed are not particularly limited as long as the second thermal fuses are affected by the PTC element being heated and are electrically connected in series to the electric circuit or the electric apparatus which is to be protected and the PTC element.

In a preferable aspect, the second thermal fuse has an activation temperature which is lower than the tripping temperature of the PTC element. Due to the second thermal fuse having such an activation temperature, it is possible for the second thermal fuse to reliably cut out after tripping of the PTC element and it is possible that the circuit is completely opened more reliably.

The tripping temperature of the PTC element described above has the meaning of a temperature in a state where the PTC element has been tripped (activated) and is in a high temperature and high resistance state, in detail, when the resistance value of the PTC element is equal to or more than $10^3$ times the normal resistance value.

In a more preferable aspect, the second thermal fuse has a cut out period at the abnormal current which is longer than the tripping period for the PTC element. Due to the second thermal fuse having such a cut out period, it is possible for the second thermal fuse to cut out after the PTC element has been tripped, that is, after the current has been significantly suppressed and it is possible to suppress arc generation which accompanies the second thermal fuse cutting out.

The tripping period for the PTC element has the meaning of the period of time from when the current, which is commutated due to the protection element being activated, passes through the PTC element to when the PTC element is tripped and is in a high temperature and high resistance state, in detail, to when the resistance value of the PTC element is equal to or more than $10^3$ times the normal resistance value.

The cut out period for the second thermal fuse has the meaning of the period of time from when the current, which is commutated due to the protection element being activated, passes through the second thermal fuse to when the second thermal fuse cuts out in cases where the current continues to flow.

In a more preferable aspect, the second thermal fuse has resistance to voltages which are equal to or more than the abnormal voltage in terms of leakage current in cases where there is a state where the PTC element is tripped. Leakage current (an extremely small current), for example, current of approximately 30 mA, can flow even after the PTC element is tripped. Due to the second thermal fuse having a resistance to voltages which are equal to or more than the abnormal current (a voltage which is applied to the circuit when there are abnormalities, for example, during shirt circuits) in terms of such leakage currents, it is possible to suppress arc generation which accompanies the second thermal fuse cutting out.

Here, since it is obvious that it is necessary for the PTC element and the second thermal fuse to be activated after the first thermal fuse, the PTC element and the second thermal fuse are not positioned so as to be affected by the resistor being heated.

In this manner, since it is possible for a portion of the current which flows in the first thermal fuse to be branched off to the circuit on the PTC element side when the first thermal fuse of the protection element is activated and it is possible to suppress arc generation during activation with the protection device of the present invention, it is possible for current to be safely interrupted even using electric circuits and electric apparatuses where there is flows of a voltage which exceeds the rated voltage of the protection element and current which exceeds the rated current of the protection element.

The current fuse which is used in the PTC device of the present invention is not particularly limited and it is possible to use current fuses which are commercially available. It is possible for a person skilled in the art to suitably select a current fuse which is to be used according to the desired properties.

There is only one of the current fuses in FIG. 1, but two or more of the current fuses may be used. In a case where two or more of the current fuses are used, the current fuses may be electrically connected in series to each other or may be electrically connected in parallel to each other. It is preferable that two or more of the current fuses be used in parallel from the point of view of increasing the overall rated current of the current fuses.

The locations where the current fuses are disposed are not limited as long as the current fuses are disposed on the main circuit (that is, the circuit which normally supplies electricity from the power source to the electric apparatus, the circuit from terminal 12 to terminal 14 via the first thermal fuse 8 in FIG. 1).

Figure 2:
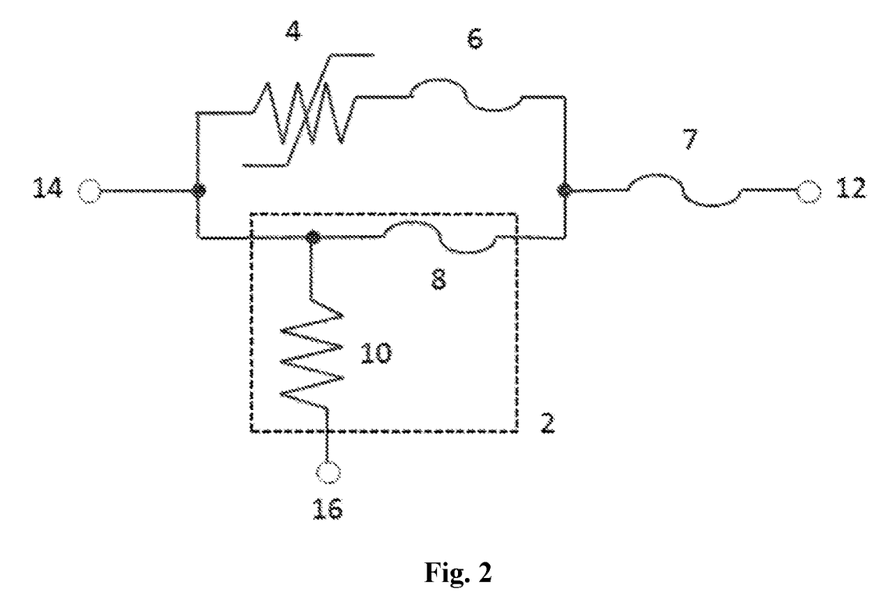
FIG. 2 is a circuit diagram of another aspect of the protection device of the present invention.

The current fuse may be electrically connected in parallel to the PTC element 4 and the second thermal fuse 6 as shown in FIG. 1 or may be electrically connected in series to the PTC element 4 and the second thermal fuse 6 as shown in FIG. 2.

Preferably, the current fuse is electrically connected in parallel to the PTC element 4 and the second thermal fuse 6 as shown in FIG. 1. Due to being arranged in parallel with the PTC element in this manner, it is possible to suppress arc generation and resistance to voltage is improved since the current, which flows in the current fuse, is commutated to the circuit on the PTC element side when the current fuse cuts out.

In a preferable aspect, the current fuse described above has a rated current which is equal to or more than 130%, preferably, equal to or more than 145%, and more preferably, equal to or more than 160%, of the rated current of the protection element described above. Due to the rated current being in this range, variation in the applied current is more permissible. In addition, the current fuse has a rated current which is equal to or less than 200%, and preferably, equal to or less than 180%, of the rated current of the protection element described above. Due to the rated current being in this range, it is possible to further heighten the sensitivity against overcurrent. Here, in cases where two or more of the current fuse are used, the rated current has the meaning of the combined values of the rated currents of each of the current fuses.

In a preferable aspect, the current fuse described above has a rated voltage which is equal to or more than 200%, and preferably, equal to or more than 250%, of the rated voltage of the protection element described above. Due to the rated voltage being in this range, the current which is permissible when there are abnormalities is larger.

In a preferable aspect, the current fuse described above has a rated voltage which is higher than the protection element described above by 20% or less, preferably, by 15% or less, and more preferably, by 10% or less.

In a more preferable aspect, the protection element 2, the PTC element 4, the second thermal fuse 6, and the current fuse 7 described above may be contained inside the same casing so that only the terminals 12, 14, and 16 protrude from the casing. Due to being contained inside a single casing in this manner, it is easy to incorporate the protection device in the electric apparatus or the electric circuit.

It is possible to impart suitable protection with regard to various abnormalities since the protection device of the present invention has a function where the circuit is opened due to the current fuse cutting out in cases where overcurrent flows through the main circuit in addition to a function where the circuit is opened due to current passing through the resistor of the protection element when there are abnormalities such as overvoltage, abnormal heat generation, overcharging, and the like.

The protection device of the present invention has been described above but various modifications of the present invention are possible.

Figure 3:
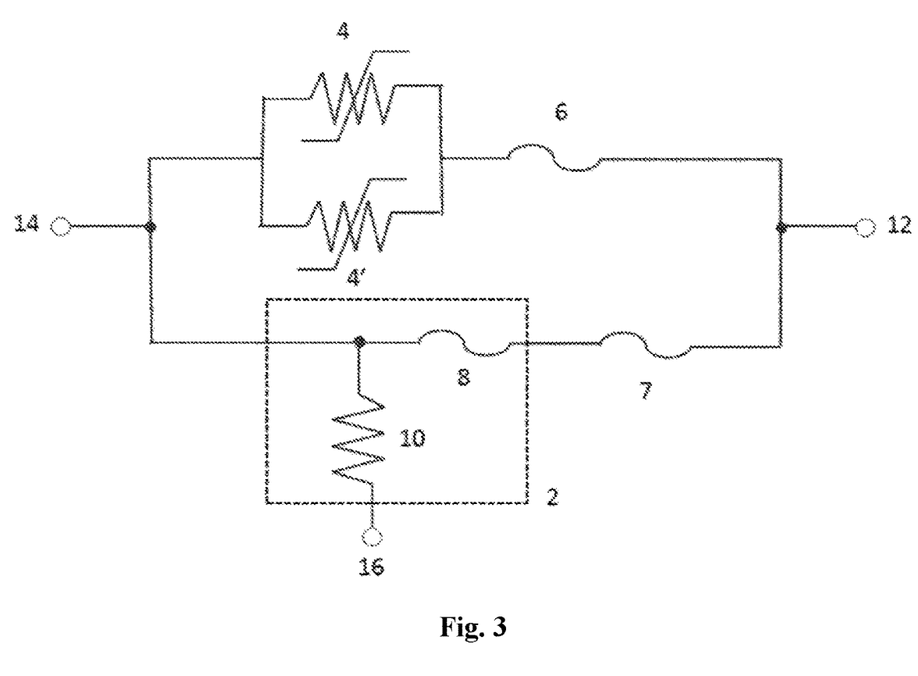
FIG. 3 is a circuit diagram of another aspect of the protection device of the present invention.

FIG. 3 shows a circuit diagram of another aspect of the protection device of the present invention.

In this aspect, the protection device of the present invention further includes one more PTC element 4'. That is, in this aspect, the protection device of the present invention includes two of the PTC elements. The PTC elements are electrically connected in parallel to each other and are electrically connected in series to the second thermal fuse. The other configurations are effectively the same as the aspect which is shown in FIG. 1.

Two of the PTC elements are used in FIG. 3, but it is possible to use three or more of the PTC elements. The PTC elements are electrically connected in parallel to each other and are electrically connected in series to the second thermal fuse.

In cases where the plurality of PTC elements are used in this manner, the "resistance value of the PTC element" described above is the combined resistance values of the plurality of PTC elements. Accordingly, due to the plurality of PTC elements being used in parallel in this manner, it is possible for the "resistance value of the PTC element" to be reduced and it is easy for the resistance values of the PTC elements to be equal to or less than the rated voltage/abnormal current of the protection element.

Even with this aspect, the locations where the current fuses are disposed are not limited as long as the current fuses are disposed on the main circuit. That is, the current fuses may be electrically arranged in series or may be electrically arranged in parallel with regard to the PTC element and the second thermal fuse.

Figure 4:
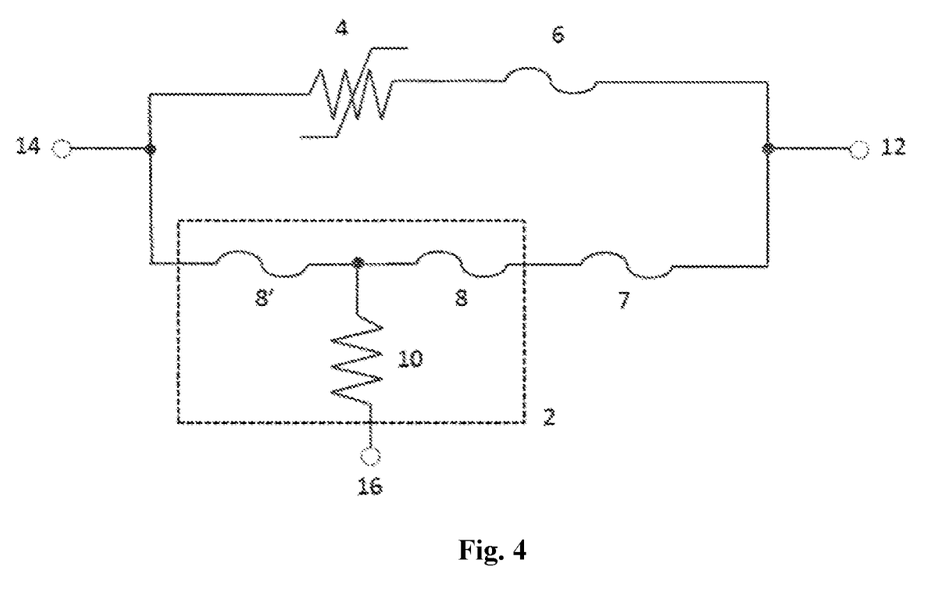
FIG. 4 is a circuit diagram of another aspect of the protection device of the present invention.

FIG. 4 shows a circuit diagram of yet another aspect of the protection device of the present invention.

In this aspect, the protection device of the present invention further includes one more first thermal fuse 8'.

Even with this aspect, the locations where the current fuses are disposed are not limited as long as the current fuses are disposed on the main circuit. That is, the current fuses may be electrically arranged in series or may be electrically arranged in parallel with regard to the PTC element and the second thermal fuse. In addition, the current fuse may be set between the first thermal fuses 8 and 8'.

Figure 5:
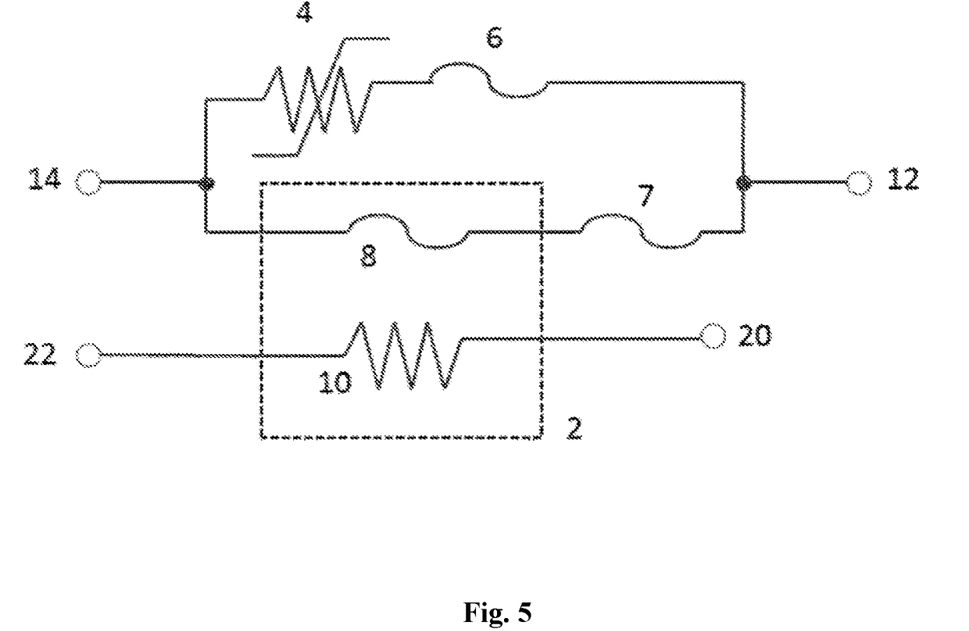
FIG. 5 is a circuit diagram of another aspect of the protection device of the present invention.

FIG. 5 shows a circuit diagram of yet another aspect of the protection device of the present invention.

The resistor is incorporated into the same circuit as the first thermal fuse in the aspect which is shown in FIG. 1, but the resistor is different in the point that the resistor is incorporated in a separate independent circuit in FIG. 5. Accordingly, in this aspect, the protection device of the present invention has four terminals, that is, the terminal 12, the terminal 14, a terminal 20, and a terminal 22. The other configurations are effectively the same as the aspect which is shown in FIG. 1.

In a second application, the present invention also proposes an electric apparatus which has the protection device of the present invention described above.

KEY TO THE FIGURES

1: Protection device
2: Protection element
4: PTC element
4': PTC element
6: Second thermal fuse
7: Current fuse
8: First thermal fuse
8': First thermal fuse
10: Resistor
12: Terminal
14: Terminal
16: Terminal
20: Terminal
22: Terminal

The invention claimed is:
1. A protection device comprising:
(i) a protection element which includes a first thermal fuse and a resistor, and in which the resistor generates heat as a result of current passing through the resistor when there are abnormalities, and the first thermal fuse is activated due to this heat and interrupts the current;
(ii) a PTC element and a second thermal fuse which are electrically connected in parallel to the first thermal fuse and which are electrically connected in series to each other; and
(iii) a current fuse which is electrically connected in series to the first thermal fuse.
2. The protection device according to claim 1, wherein the current fuse is electrically connected in series to the PTC element and the second thermal fuse.
3. The protection device according to claim 1, wherein the current fuse is electrically connected in parallel to the PTC element and the second thermal fuse.
4. The protection device according to claim 1, wherein the protection element is a fusing register.

5. The protection device according to claim 1, wherein the first thermal fuse and the resistor are each incorporated into separate independent circuits in the protection element.

6. The protection device according to claim 1, wherein the PTC element is a polymer PTC element.

7. The protection device according to claim 1, wherein the resistance value of the PTC element at the usage temperature is equal to or less than the rated voltage/abnormal current of the protection element.

8. The protection device according to claim 6, wherein the resistance value of the PTC element at a temperature, which is 10° C. lower than the softening point of the polymer materials of the polymer PTC element, is equal to or less than the rated voltage/abnormal current of the protection element.

9. The protection device according to claim 1, wherein the activation period for the PTC element is longer than the insulation period for the fuse element of the first thermal fuse.

10. The protection device according to claim 1, wherein the activation period for the PTC element is equal to or more than 3 milliseconds.

11. The protection device according to claim 1, further comprising:
one or more different PTC elements which are electrically connected in parallel to the PTC element and which are electrically connected in series to the second thermal fuse.

12. The protection device according to claim 1, wherein the activation temperature of the second thermal fuse is lower than the tripping temperature of the PTC element.

13. The protection device according claim 1, wherein the cut out period for the second thermal fuse at the abnormal current is longer than the tripping period for the PTC element.

14. The protection device according to claim 1, wherein the rated voltage of the current fuse is equal to or more than 200% of the rated voltage of the protection element.

15. The protection device according to claim 1, wherein the rated current of the current fuse is equal to or more than 130% of the rated current of the protection element.

16. The protection device according to claim 1, wherein the protection element, the PTC element, the second thermal fuse, and the current fuse are contained inside a casing.

17. An electric apparatus comprising:
the protection device according to claim 1.

* * * * *